(12) United States Patent
Mitchell

(10) Patent No.: US 9,920,875 B2
(45) Date of Patent: Mar. 20, 2018

(54) ARTICULATING ARM

(71) Applicant: Avigilon Corporation, Vancouver (CA)

(72) Inventor: Ross Allen Mitchell, Surrey (CA)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/405,887

(22) Filed: Jan. 13, 2017

(65) Prior Publication Data

US 2017/0205027 A1 Jul. 20, 2017

Related U.S. Application Data

(60) Provisional application No. 62/278,893, filed on Jan. 14, 2016.

(51) Int. Cl.
| | |
|---|---|
| *F16M 13/02* | (2006.01) |
| *G03B 17/56* | (2006.01) |
| *F16M 11/10* | (2006.01) |
| *F16M 11/16* | (2006.01) |
| *F16M 11/20* | (2006.01) |

(52) U.S. Cl.
CPC ............ *F16M 13/02* (2013.01); *F16M 11/10* (2013.01); *F16M 11/16* (2013.01); *F16M 11/2028* (2013.01); *G03B 17/561* (2013.01); *F16M 2200/024* (2013.01)

(58) Field of Classification Search
None
See application file for complete search history.

(56) References Cited

U.S. PATENT DOCUMENTS

| | | | |
|---|---|---|---|
| 5,790,910 A | 8/1998 | Haskin | |
| 5,929,910 A | 7/1999 | Kim et al. | |
| 6,008,846 A | 12/1999 | Uehara et al. | |
| 7,599,000 B2 | 10/2009 | Lai | |
| 7,927,027 B2 | 4/2011 | Yamakose et al. | |
| 8,998,512 B1 | 4/2015 | Celler | |
| 9,250,500 B2 | 2/2016 | Celler | |
| 2007/0289096 A1* | 12/2007 | Zhang | E05D 5/125 16/273 |
| 2008/0226282 A1 | 9/2008 | Takahashi | |
| 2009/0002548 A1 | 1/2009 | Liang et al. | |
| 2011/0102587 A1 | 5/2011 | Zittel | |
| 2011/0277213 A1* | 11/2011 | Stoehr | A44B 5/02 2/123 |
| 2015/0176753 A1* | 6/2015 | Esterbauer | F16M 11/08 248/176.3 |
| 2017/0205027 A1* | 7/2017 | Mitchell | F16M 13/02 |
| 2017/0205687 A1* | 7/2017 | Mitchell | G03B 17/561 |

* cited by examiner

*Primary Examiner* — WB Perkey
(74) *Attorney, Agent, or Firm* — Klarquist Sparkman, LLP

(57) ABSTRACT

A swivel joint for an articulating arm comprising a section having a bore with an annular groove where the bore is sized for a stud, with another annular groove, of a plate to slide into the bore. A retaining ring seats in the annular grooves to swivelly couple the section with the plate. The arm may be advantageously used in a camera assembly, such as a bullet camera, to point the camera once mounted on a wall or ceiling.

18 Claims, 23 Drawing Sheets

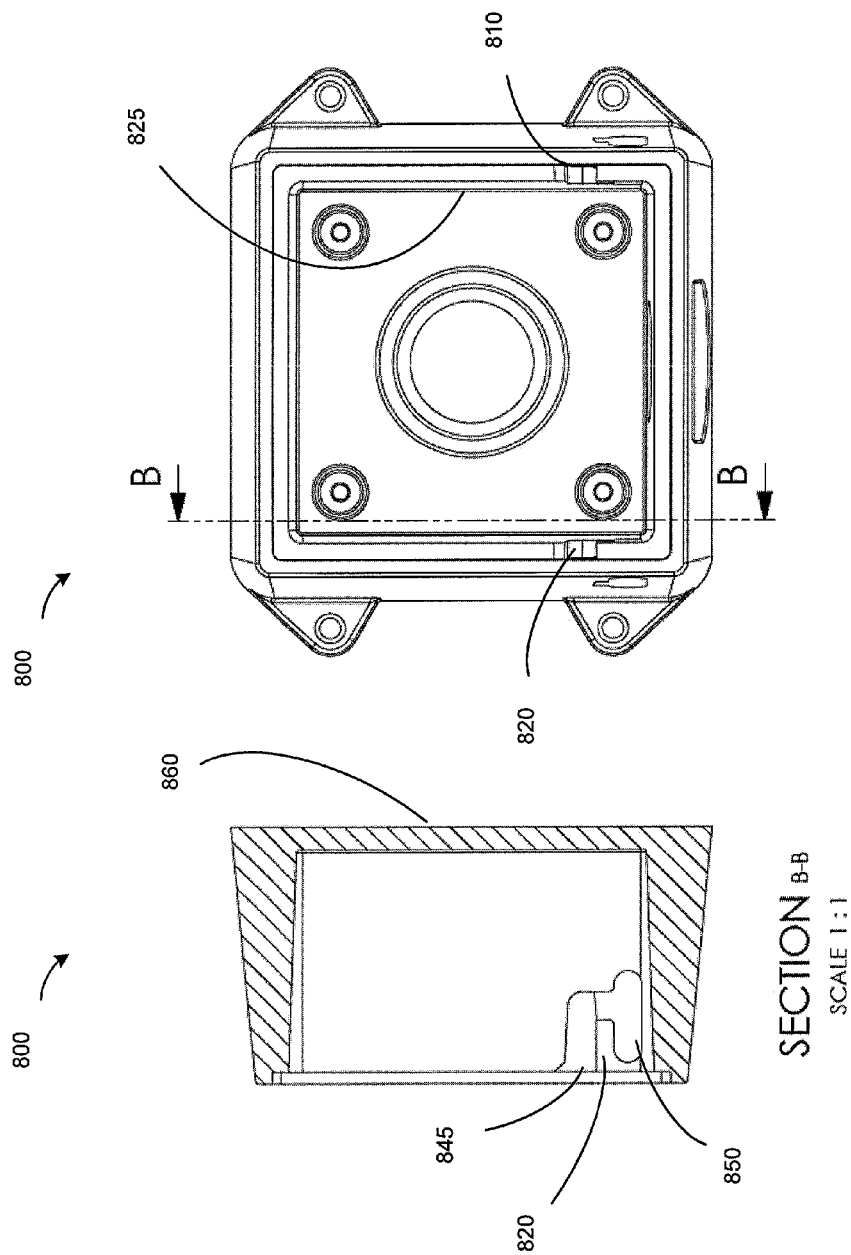

ARTICULATING ARM

CROSS REFERENCE TO RELATED APPLICATION

This application claims the benefit of U.S. Provisional Application Ser. No. 62/278,893, entitled ARTICULATING ARM, filed on Jan. 14, 2016, which application is incorporated by reference herein.

TECHNICAL FIELD

The present disclosure is directed at an articulating arm and a camera assembly comprising the articulating arm.

BACKGROUND

A surveillance camera is typically positioned so that it is able to record actions occurring in a region of interest. The manner in which the camera's position is adjusted may vary with the type of camera and the nature of the installation. For example, the position of a dome camera that is mounted flush against a ceiling may be adjusted by rotating the dome camera against the ceiling, while the position of a bullet camera that is connected to an arm mounted to a wall may be adjusted by moving the arm. Regardless of the nature of the installation or type of camera, the camera's position is typically adjusted by a technician when installing the camera and from time to time during the life of the camera.

Existing arm sections typically use 2 components with gaskets/bushings and multiple screws to assemble the components into a finished arm. The internal bosses limit the space inside the arm with respect to any wiring. Sealants are applied to the wiring but occasionally fail in the field. The arms may not pass an IK10 impact test. Lastly the various components are time consuming to assemble and do not provide a permanent assembly.

SUMMARY

According to a first aspect, there is provided an articulating arm for mounting a device housing with a device to a mounting bracket, the arm comprising a device plate connected to the device housing; a device section coupled to the device plate; a mounting section pivotably coupled to the device section at a hinged joint; and a mounting plate swivelly coupled to the mounting section, wherein the mounting plate comprises a stud of elongate shape having an annular groove and the mounting section comprises a bore with an annular groove wherein the bore is sized for the stud to slide into the bore; and a first retaining ring having an inner edge and an outer edge such that the outer edge of the first retaining ring seats in the annular groove of the bore, and the inner edge of the first retaining ring seats in the annular groove of the stud.

The device section may be swivelly coupled to the device plate, the device plate comprises a stud of elongate shape having a annular groove, and the device section comprises a bore with an annular groove wherein the bore of the device section is sized for the stud of the device plate to slide into the bore of the device section; and a second retaining ring having an inner edge and an outer edge such that the outer edge of the second retaining ring seats in the annular groove of the bore of the device section, and the inner edge of the second retaining ring seats in the annular groove of the stud of the device plate.

The stud of the mounting plate may further comprise a tapered section such that the tapered section has a smaller front end and has a larger end towards a base end, the first retaining ring seated in the annular groove of the bore is sized such that the front end of the stud is smaller than an inner edge of the first retaining ring so that the stud initially slides into the first retaining ring and the tapered section thereafter enlarges the first retaining ring as the stud slides further into the bore until the first retaining ring is seated in the annular groove of the stud to couple the mounting plate to the mounting section.

The stud of the device plate may further comprise a tapered section such that the tapered section has a smaller front end and has a larger end towards a base end, the second retaining ring seated in the annular groove of the bore of the device section is sized such that the front end of the stud is smaller than an inner edge of the second retaining ring so that the stud initially slides into the second retaining ring and the tapered section thereafter enlarges the second retaining ring as the stud of the device plate slides further into the bore of the device section until the second retaining ring is seated in the annular groove of the stud of the device plate to couple the device plate to the device section.

The interiors of the sections and the plates collectively may comprise a wiring conduit extending through the interior of the articulating arm permitting wire to pass through the device plate and out of the mounting plate while entirely contained within the articulating arm. The articulating arm may further comprise a mounting grommet configured to resist the wire twisting across the hinged joint. The articulating arm may further comprise a mounting grommet and a device grommet configured to resist the wire twisting across the hinged joint.

The stud and the bore of the mounting section and the mounting plate each may have a cylindrical portion for the bore of the mounting section to swivel relative to the stud of the mounting plate. The stud and the bore of the device section and the device plate each may have a cylindrical portion for the bore of the device section to swivel relative to the stud of the device plate.

The retaining ring may be one of a spiral retaining ring, split retaining ring, and circular retaining ring. The bracket may be a junction box. The device plate may be integrated into the device housing. The mounting bracket may be integrated into the mounting plate.

The articulating arm may further comprise a stop block on the mounting section and a stop block on the mounting plate to limit the relative rotation between the mounting section and the mounting plate. The articulating arm may further comprise a stop block on the device section and a stop block on the device plate to limit the relative rotation between the device section and the device plate.

According to another aspect, there is provided a swivel joint for coupling a section and a plate of an arm, the joint comprising a retaining ring; the plate, comprising a stud of elongate shape having an annular groove and a cylindrical portion; and the section, comprising a bore having a cylindrical portion and an annular groove wherein the bore is sized for the stud to slide into the bore; the retaining ring having an inner edge and an outer edge such that the outer edge of the retaining ring seats in the annular groove of the bore, and the inner edge of the retaining ring seats in the annular groove of the stud when the stud is slid into the bore; wherein the stud of the plate further comprises a tapered section such that the tapered section has a smaller end integral with the front end and a larger end towards the base, the retaining ring seated in the annular groove of the bore is sized such that the front end of the stud is smaller than the inner edge of the retaining ring so that the stud initially slides into the retaining ring and the tapered section thereafter enlarges the inner edge as the stud slides further into the bore until the retaining ring is seated in the annular groove of the stud to couple the plate to the section; and wherein the cylindrical portion of the stud, the cylindrical portion of the bore, and the retaining ring are positioned to permit the section to rotate relative the plate.

The interiors of the section and the plate collectively comprise a wiring conduit extending through the interior of the arm permitting wire to pass through the section and out of the plate while entirely contained within the arm. The retaining ring may be one of a spiral retaining ring, split retaining ring, and circular retaining ring. The swivel joint may further comprise a stop block on the section and a stop block on the plate to limit the relative rotation between the section and the plate.

BRIEF DESCRIPTION OF THE DRAWINGS

In the accompanying drawings, which illustrate one or more example embodiments:

FIG. 1 B is an exploded view of the parts of the camera assembly.

FIG. 1 C is a side sectional view of the camera assembly.

FIG. 1 D is a top sectional view of the camera assembly.

FIG. 2 B are side views and sectional views of the device section and the mounting section.

FIG. 3 B is a side view of the device plate.

FIG. 8 B is a top view of the junction box with a section B-B line.

FIG. 8 C is a sectional view of the junction box.

FIG. 8 D is a left perspective view of the junction box.

DETAILED DESCRIPTION

Figure 1A:
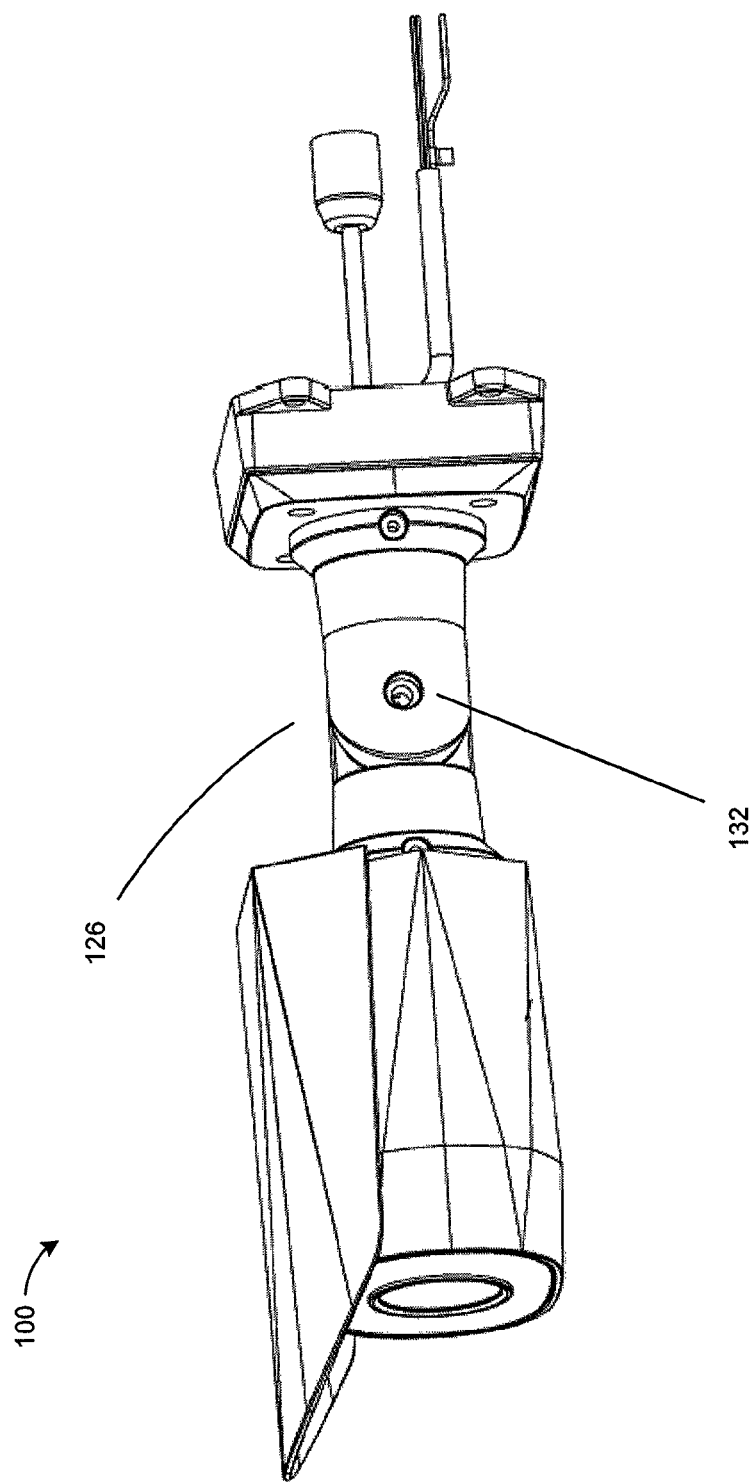
FIG. 1 A is perspective view of a camera assembly with a mounting bracket according to one embodiment.
Figure 1B:
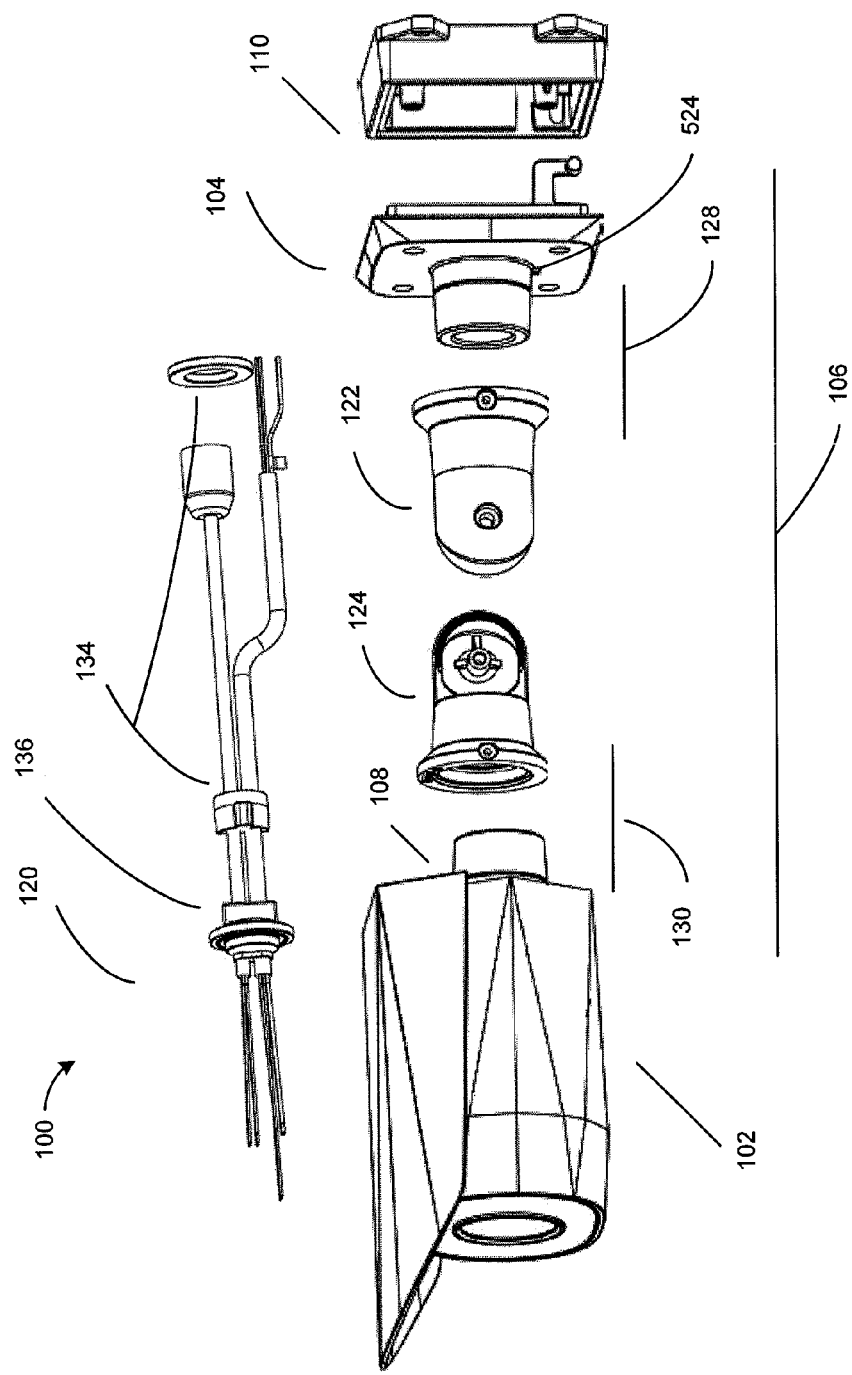
Figure 1C:
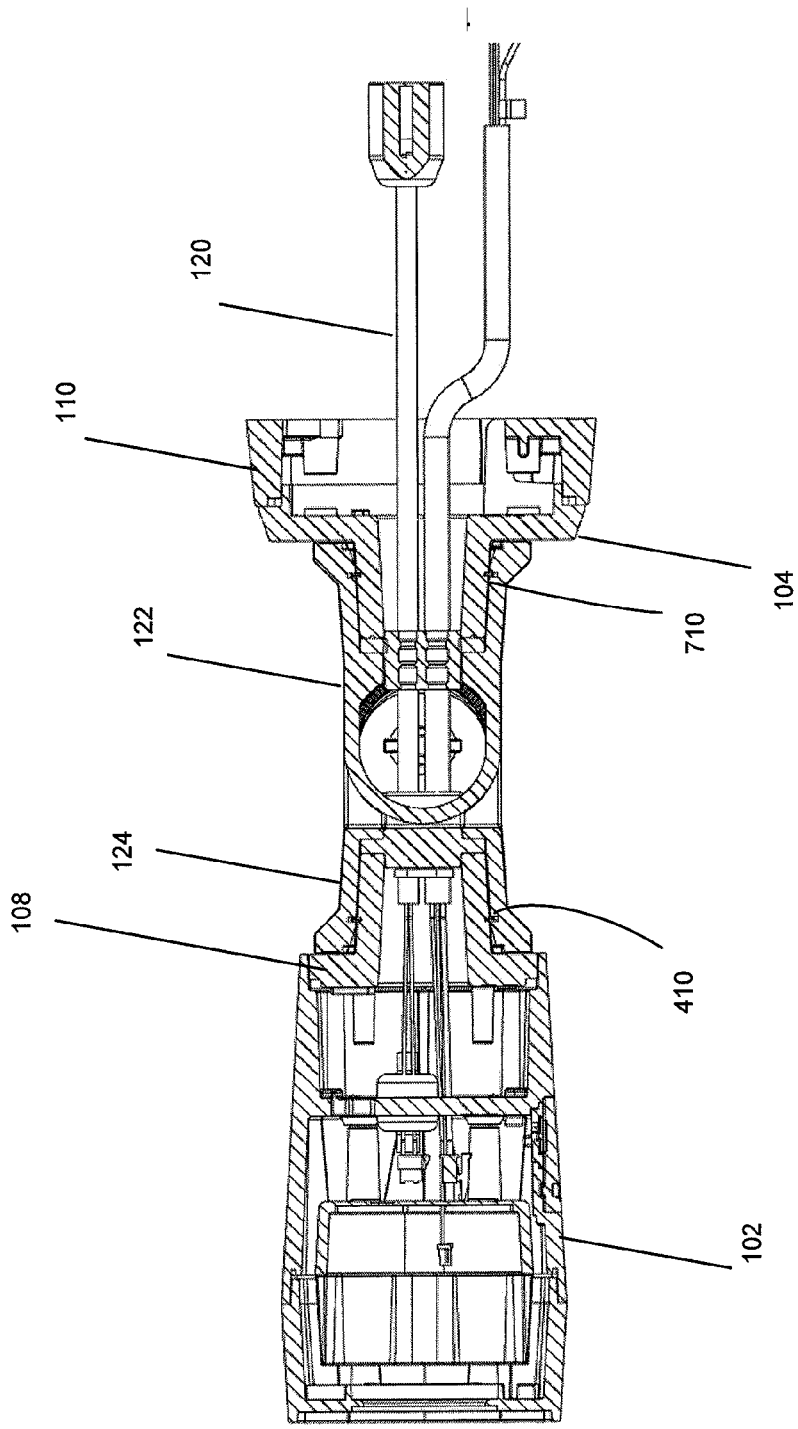
Figure 1D:
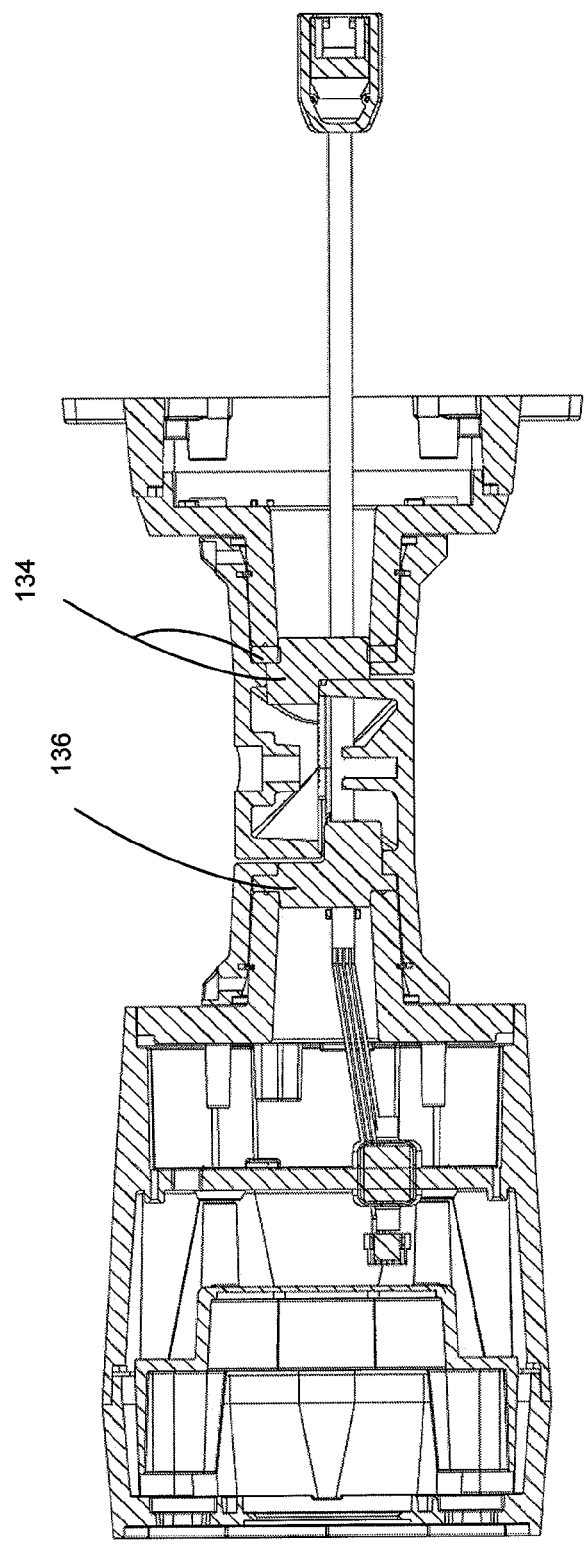

Directional terms such as "top", "side", "right", "left", "front", and "back" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first component is coupled to a second component, that coupling may be through a direct connection or through an indirect connection via other components and connections. Similarly, if the first component is communicatively coupled to the second component, communication may be through a direct connection or through an indirect connection via other components and connections.

The terms annular, cylindrical, ring, and other such terms are intended to be read with the adjective "substantially" so as not to limit their scope.

While the embodiments herein describe a camera assembly for mounting a camera having a device housing, it will be understood that the embodiments herein are also applicable to a sensor assembly for mounting a sensor having a device housing. The sensor may include one or more of audio, motion, lighting sensing capabilities. Embodiments herein are further applicable to an electronic device assembly for mounting an electronic device having a device housing.

One way in which to mount a camera, such as a bullet camera, to a mounting surface such as a ceiling or a wall is to attach the camera to a mounting arm and to then attach the mounting arm to the mounting surface. If the mounting arm is an articulating mounting arm (hereinafter simply an "articulating arm") that has at least one degree of freedom, as in the embodiments described herein, the arm can facilitate positioning the camera at a region of interest.

More particularly, the embodiments described herein are directed at a camera assembly that comprises a device housing, a device plate, an articulating arm, and a mounting plate used to mount the camera assembly to a mounting surface. The articulating arm comprises multiple sections coupled together at joints, wherein a first end of a first of the sections is coupled to the mounting plate and a second end of a second of the sections is coupled to the device housing, each of the joints couples one of the sections to an immediately preceding one of the sections, and at least one of the joints is movable. The articulating arm is accordingly coupled together in series: an end of any one of the sections is connected to an end of the immediately following section. Interiors of the sections collectively comprise a wiring conduit extending through the interior of the articulating arm permitting wire to pass from the device housing to the mounting plate while entirely contained within, and accordingly protected by, the articulating arm.

The components described herein may be made of metal, plastic, and any other relatively rigid material. The embodiments described below are made of metal.

FIGS. 1 A, 1 B, 1 C and 1 D respectively show perspective, exploded, top sectional and side sectional views of a camera assembly 100 comprising a device housing 102 and an articulating arm 106 that connects the device housing 102 to a mounting bracket (or bracket) 110 for mounting the camera assembly 100 to a surface (e.g. wall or ceiling), and a wiring harness 120 for connecting a sensor such as a camera to electrical power sources and control centers. The screws were not depicted in FIGS. 1 C and 1 D.

The depicted articulating arm 106 comprises a device plate 108, a mounting plate 104, and two sections: a first section that is a mounting section 122, and a second section that is a device section 124, which are hinge coupled together at a hinge joint 126. In the camera assembly 100, the end of the mounting section 122 opposite the hinge joint 126 (i.e., the end in proximity to the mounting plate 104) is connected to the mounting plate 104 using a mounting swivel joint 128 (a movable joint). Analogously, the end of the device section 124 opposite the hinge joint 126 (i.e., the end in proximity to the device plate 108) is connected to the device plate 108 using a device swivel joint 130. The terms mounting and device are for reference and are not intended to suggest any limitations.

The interiors of the sections and the plates collectively comprise a wiring conduit extending through the interior of the articulating arm 106 permitting the wiring harness 120 to pass through the device plate 108 and out of the mounting plate 104 while entirely contained within the articulating arm 106. The wiring harness 120 further has a device grommet 136 and a mounting grommet 134 of a shape, which are locked in motion with the sections 122, 124, to resist the wiring being twisted across the hinged joint 126 as the two swivel joints 126, 128 are rotated. The grommets 136, 134 also have notches to increase the resistance against the wiring twisting across the hinged joint 126.

The grommet 134 is a 2 part grommet composed of a main body and a sealing washer. Together they form a mechanical structure similar to the grommet 134 when assembled except the grommet 134 is sized to allow passage of the wiring harness 120 through the sections 122, 124 and the plates 104, 108 as needed before the sealing washer is installed.

According to another embodiment, the device plate 108 is integrated with the device housing 102. The device housing 102 comprises a stud. Analogously, in another embodiment, the mounting plate 104 is integrated with the bracket 110. The bracket 110 comprises a stud.

The mounting and device swivel joints 128,130 are discussed in more detail below together with FIGS. 2 A-2 B, 3 A, 3 B, 4 and 5. Although the depicted embodiment shows the articulating arm 106 movably coupled to the device housing 102 and the bracket 110 using movable joints, in alternative embodiments the articulating arm 106 is fixedly coupled to the device housing 102, but movably coupled through the mounting plate 104 to the bracket 110. Further, the depicted embodiment shows the articulating arm 106 having the mounting section 122 and the device section 124 coupled to the mounting plate 104 and the device plate 108 respectively. The mounting section 122 and the device section 124 may instead be coupled to the device plate 108 and the mounting plate 104 respectively. The terms mounting and device are for reference and are not intended to suggest any limitations.

Figure 2:
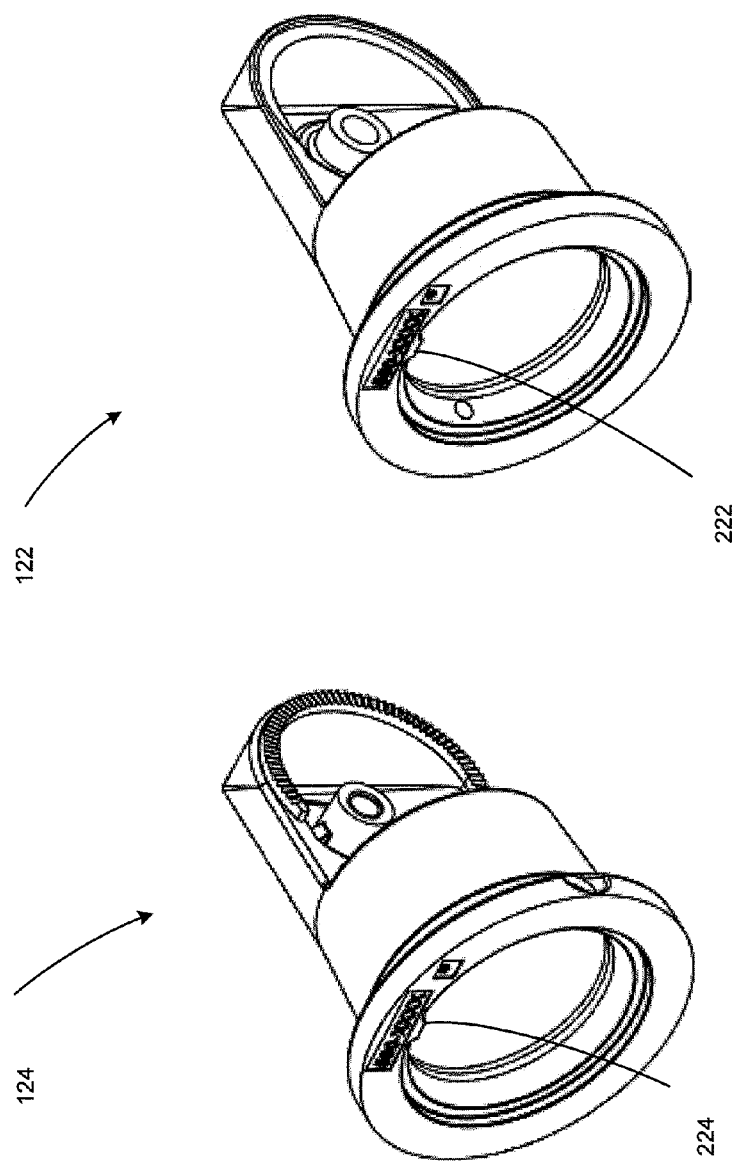
FIG. 2 A is perspective view of a device section and a mounting section of an articulating arm of the camera assembly.
Figure 2:
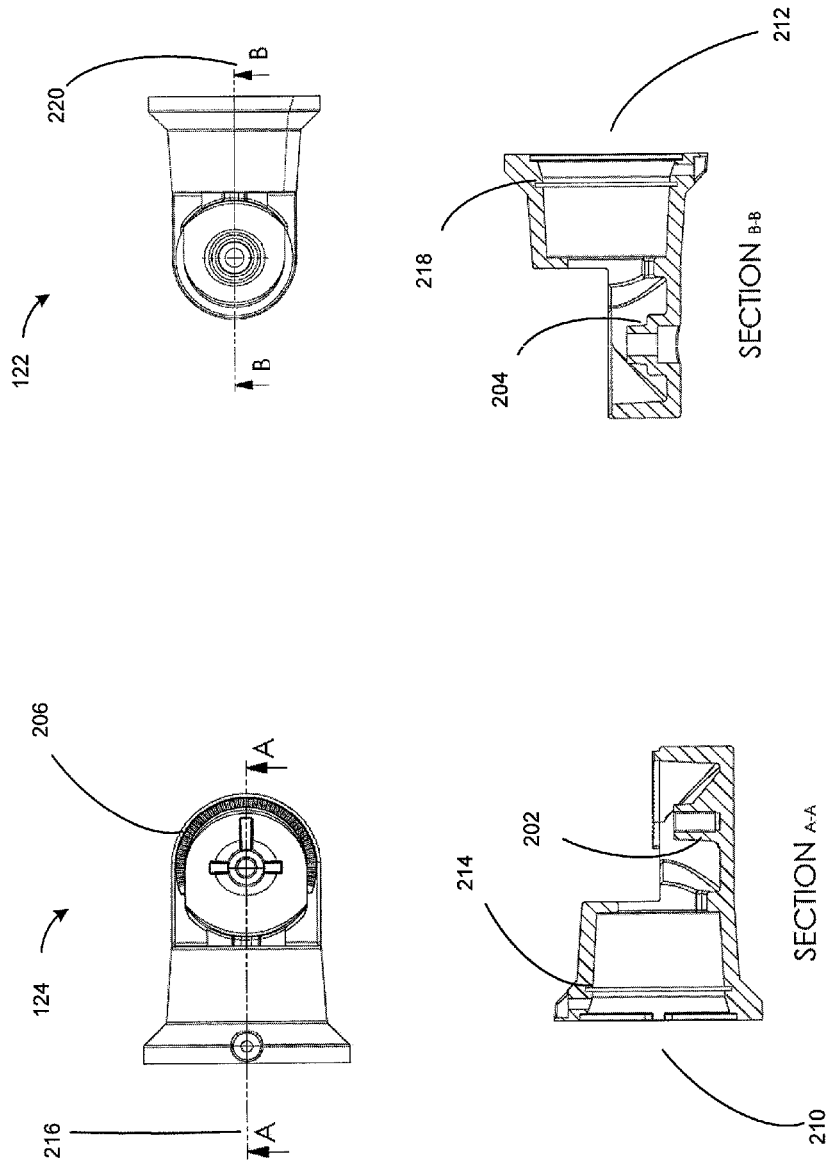
Figure 3:
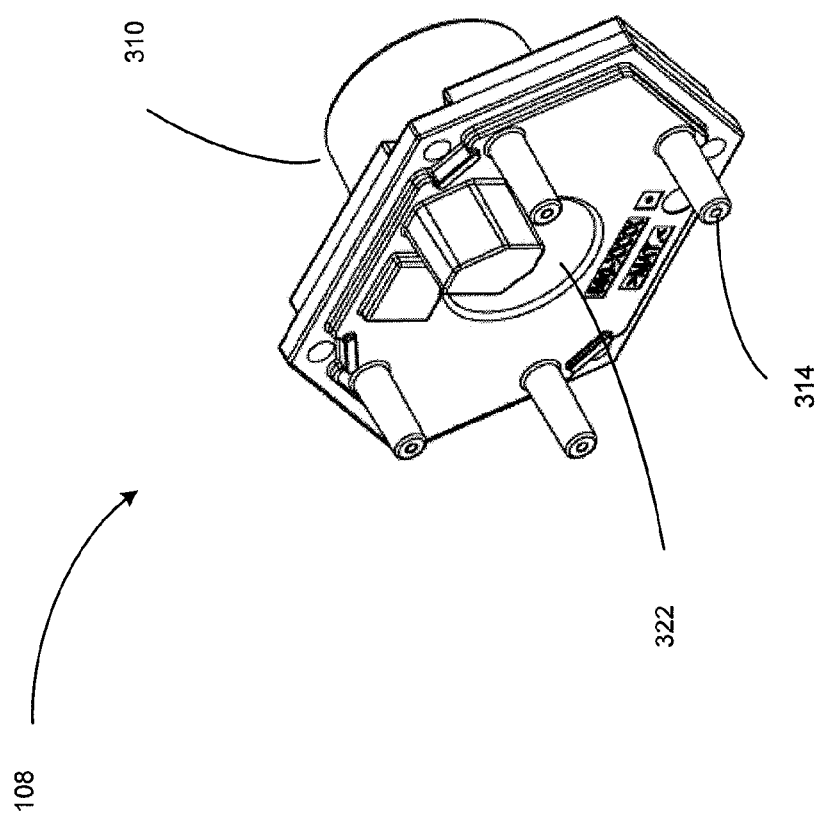
FIG. 3 A is a back perspective view of a device plate of the camera assembly.
Figure 3:
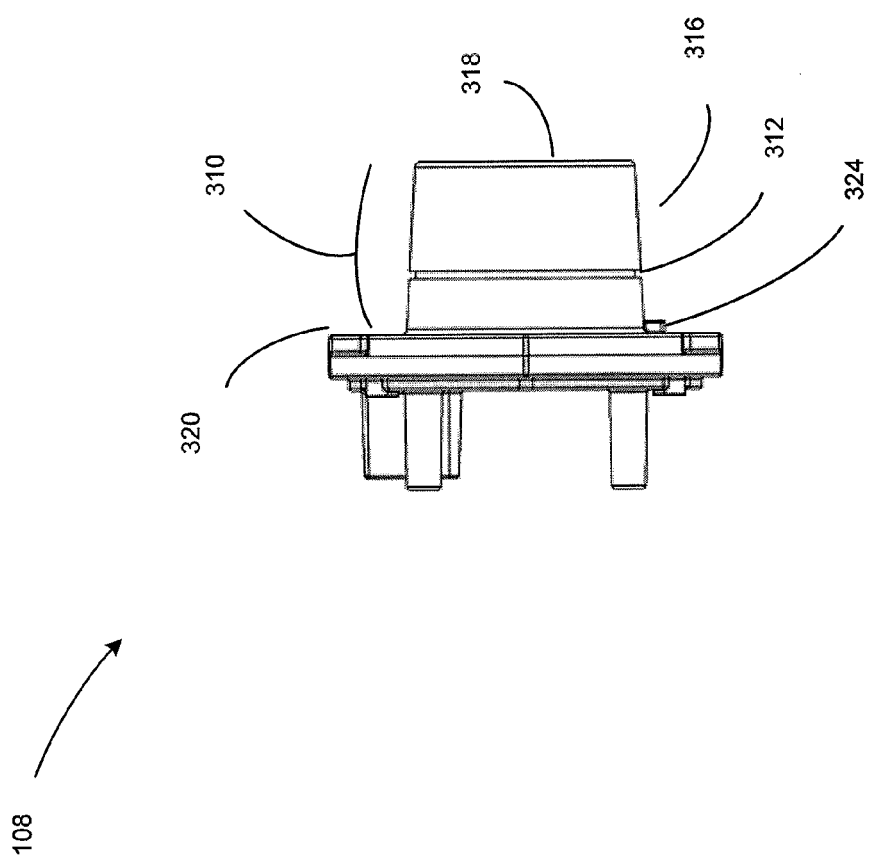

FIGS. 2 A and 2 B respectively show perspective and sectional views of parts of the articulating arm 106 in isolation.

A rod segment extends inwardly from each of the concave surfaces of the device section 124 and the mounting section 122, the rod segment extending from the mounting section 122 is rod segment 204, and the rod segment extending from the device section 124 is rod segment 202. The rod segments 202, 204 align to form a rod into which a screw 132 is screwed through the mounting section 122 to the device section 124. As shown the mounting section 122 and the device section 124 pivot about the screw 132.

A rod (of rod segments 202, 204) and the screw 132 accordingly comprise the hinge joint 126, which permits the mounting section 122 and the device section 124 to pivot relative to each other. The screw 132 can be screwed fully through the rod, thus clamping the mounting and device sections 122,124 together and preventing the mounting section 122 from pivoting relative to the device section 124. A segment of an edge of the device section 124 lined with teeth 206 that contact an edge of the mounting section 122 provide tactile feedback during pivoting of the mounting and device sections 122,124. The teeth 206 increase the friction between the mounting and device sections 122,124 when the two sections 122,124 are clamped together using the screw 132, thus helping to prevent unwanted movement.

Referring now in particular to FIGS. 1 C, 2 B, 3 A, 3 B and 4, the device swivel joint 130 comprises a cylindrical first male portion of a stud 310 that extends from the device plate 108 and a cylindrical first female portion of a bore 210 that receives the stud 310, starting at the base of the device section 124 of the articulating arm 106. The stud 310 has an annular groove 312 for receiving or seating an inner edge 430 of a retaining ring 410. The bore 210 also has an annular groove 214 for seating an outer edge 420 of the retaining ring 410. The cylindrical first male portion and the cylindrical first female portion along with the retaining ring 410 each has an axis in alignment with the section A-A line 216 to permit the device plate 108 to swivel or rotate relative to the device section 124 of the arm 106.

The stud 310 has an elongate shape, including the cylindrical first male portion, having the annular groove 312, a tapered section 316, a front end 318, and a base end 320 where the tapered section 316 has a smaller end integral with the front end 318 and a larger end towards the base end 320. The device plate 108 has a hollow cavity 322 running from the back of the device plate 108 through the stud 310 and out the front end 318 of the stud 310. There are screw holes 314 for coupling the device plate 108 to the device housing 102.

The device section 124 having the bore 210 with the annular groove 214 is sized for the stud 310 to slide into the bore 210. As is known in the art, the retaining ring 410 is resilient in that the inner edge 430, the outer edge 420, and the diameter of the ring 410 increase or decrease in size as force is applied accordingly. The outer edge 420 of the retaining ring 410 seats in the annular groove 214 of the device section 124, the inner edge 430 of the retaining ring 410 seats in the annular groove 312 of the stud 310 when the stud 310 is slid into the bore 210 of the device section 124, and the inner edge 420 of the retaining ring 410 is sized for the front end 318 of the stud 310 to pass through the retaining ring 410 initially. As the stud 310 slides further into the bore 210, the tapered section 316 forces the ring 410 diameter to enlarge or increase in size for passage of the stud 310 into the bore 210 until the inner edge 430 seats into the annular groove 312 of the stud 310 while engaging annular groove 214. The annular groove 214 is accordingly deep enough for the retaining ring 410 to enlarge as needed. At this point, the stud 310 is snapped into a retained position with the bore 210 and cannot slide either further into or out of the bore 210 as the retaining ring 410 is seated in the annular grooves 214, 312.

Figure 4:
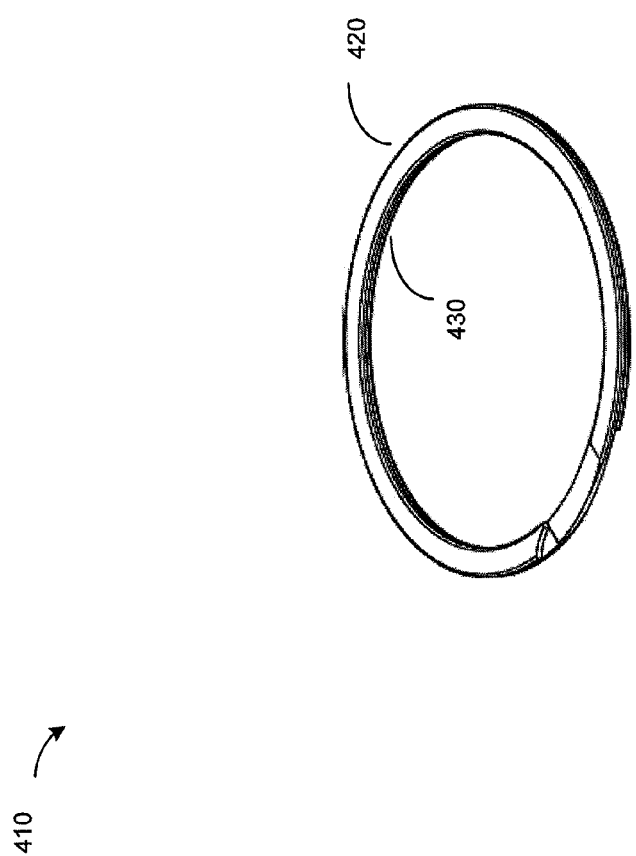
FIG. 4 is a perspective view of a retaining ring of the device section of the camera assembly.
Figure 5:
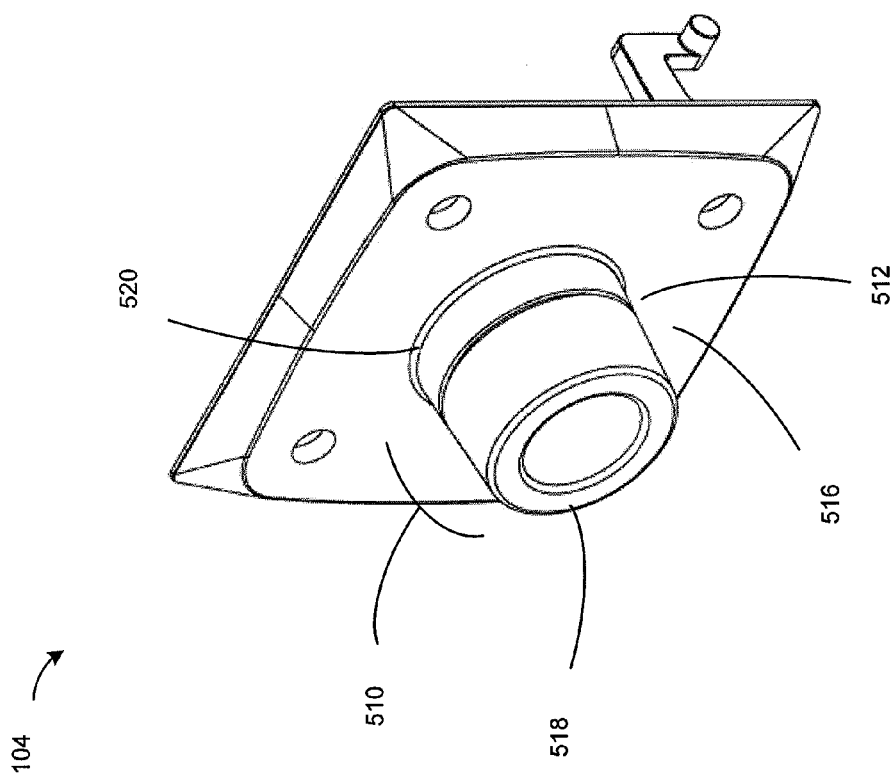
FIG. 5 is a front perspective view of a mounting plate of the camera assembly.

The retaining ring 410 as showing in FIG. 4 is a spiral retaining ring. However, it will be understood that a large number of retaining rings known in the art will also work in the described embodiments such as split retaining rings and open circular retaining rings.

Further, according to another embodiment the grommets 134, 136 have sealing rings such that the sliding of the sealing surfaces are constrained to occur between the face of the studs 310, 510 and the grommet washer sealing rings. The surface areas of the compressed sealing ring is smaller than the opposite side of the washer so that it more freely slides compared to the opposite side, the bores 210, 212.

Analogously, and referring now in particular to FIGS. 1 C, 2 A, 2 B, 5, 6 and 7, the mounting swivel joint 128 comprises a cylindrical first male portion of a stud 510 that extends from the mounting plate 104 and a cylindrical first female portion of a bore 212 that receives the stud 510. The stud 510 has an annular groove 512 for receiving or seating an inner edge 730 of a retaining ring 710. The bore 212 also has an annular groove 218 for seating an outer edge 720 of the retaining ring 710. The cylindrical first male portion and the cylindrical first female portion along with the retaining ring 710 each has an axis in alignment with the section B-B line 220 to permit the mounting plate 104 to swivel or rotate relative to the mounting section 122 of the arm 106.

The stud 510 has an elongate shape, including the cylindrical first male portion, having the annular groove 512, a tapered section 516, a front end 518, and a base end 520 where the tapered section 516 has a smaller end integral with the front end 518 and a larger end towards the base end 520. The mounting plate 104 has a hollow cavity running from the back of the mounting plate 104 through the stud 510 and out the front end 518 of the stud 510.

The mounting section 122 having the bore 212 with the annular groove 218 is sized for the stud 510 to slide into the bore 212. As is known in the art, the retaining ring 710 is resilient in that the inner edge 730, the outer edge 720, and the diameter of the ring 410 increase or decrease in size as force is applied accordingly. The outer edge 720 of the retaining ring 710 seats in the annular groove 218 of the mounting section 122, the inner edge 730 of the retaining ring 710 seats in the annular groove 512 of the stud 510 when the stud 510 is slid into the bore 212 of the mounting section 122, and the inner edge 720 of the retaining ring 710 is sized for the front end 518 of the stud 510 to pass through the retaining ring 710 initially. As the stud 510 slides further into the bore 212, the tapered section 516 forces the retaining ring 410 diameter to enlarge or increase in size for passage of the stud 510 into the bore 212 until the inner edge 730 seats into the annular groove 512 of the stud 510. The annular groove 218 is accordingly deep enough for the retaining ring 710 to enlarge as needed. At this point, the stud 510 is snapped into a retained position with the bore 212 and cannot slide either further into or out of the bore 212 as the retaining ring 710 is seated in the annular grooves 218, 512.

According to one embodiment, the retaining ring 410 is a spiral design, because such rings may have a low profile and ease of expansion. Other retaining rings would work but may require more than hand pressure to assemble. Alternatively, a retaining ring may be seated on a stud of a plate for insertion into a tapered portion of a bore of a section (for example a taper bell section). However, it may harder to compress the retaining ring using the tapered bell section in this configuration.

The interiors of the sections 122, 124 and the plates 104, 108 collectively comprise a wiring conduit extending through the interior of the articulating arm 106 permitting wire harness 120 to pass from the device plate 108 through a hole 318 to the mounting plate 104 and out through a hole 522 while entirely contained within the articulating arm 106.

In a further embodiment, the retaining ring 410 is the same size as the retaining ring 710 and the mounting swivel joint 128 is the same size as the device swivel joint 130.

In a further embodiment, the studs 310, 510 do not have the tapered section. The annular grooves 312, 512 are deep enough for the retaining rings 410, 710 to be compressed or decreased in diameter to fit therein for the studs 310, 510 to slide into the bores 210, 212 wherein the retaining rings 410, 710 resiliently decompress or enlarge to seat into the annular grooves 214, 218 to accordingly couple the bores 210, 212 with the studs 310, 510 in the retained position.

Figure 6:
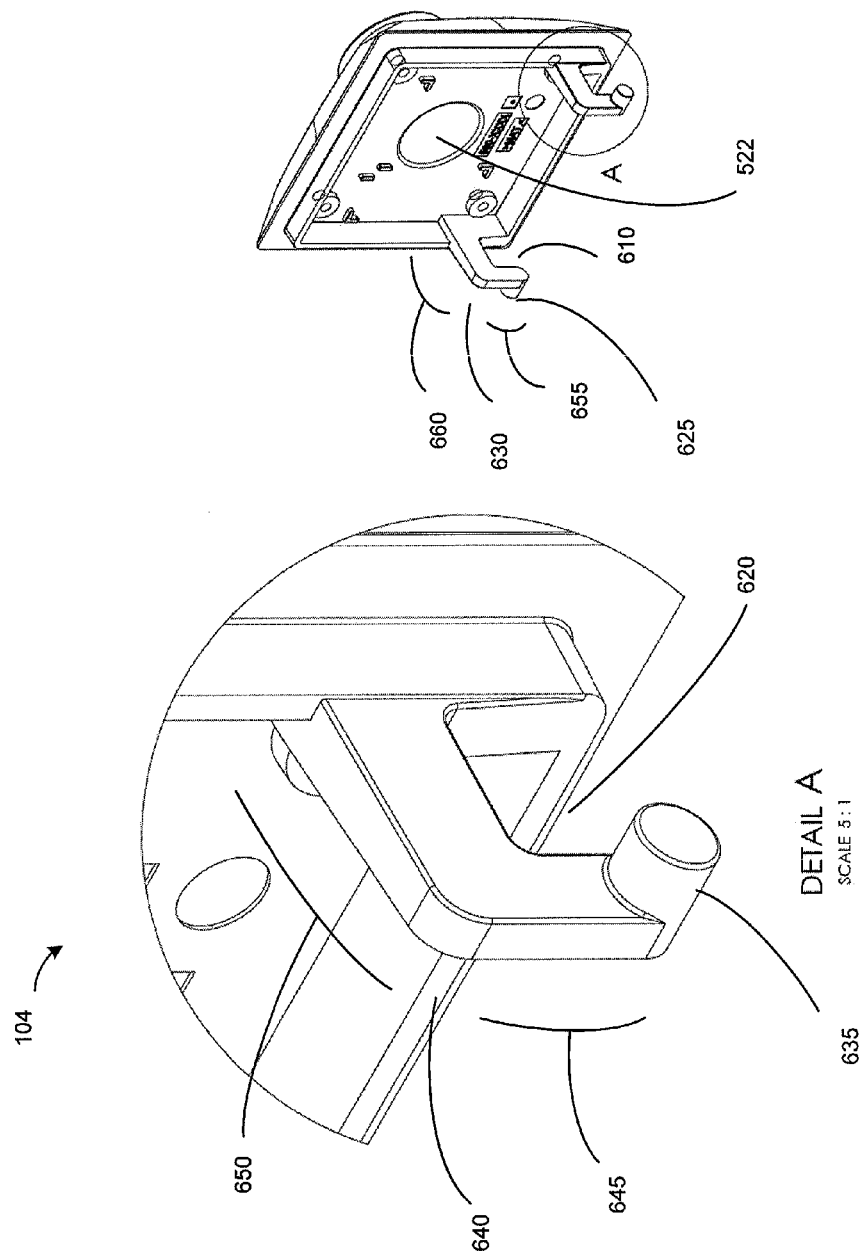
FIG. 6 is a back perspective view of the mounting plate with a detail A.
Figure 7:
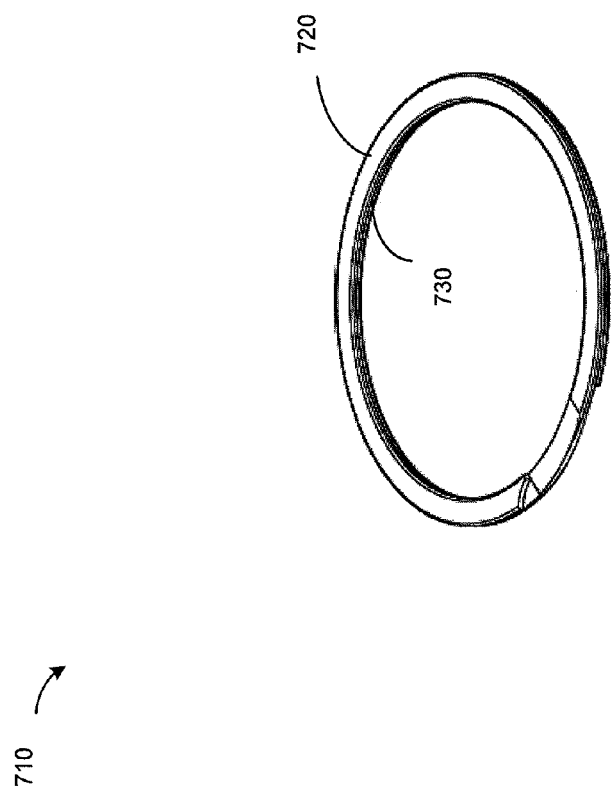
FIG. 7 is a perspective view of a retaining ring of the mounting section of the camera assembly.

Referring now to FIG. 6, there is shown a back perspective view of the mounting plate 104 with an expanded view of detail A. The mounting plate 104 further comprises a first hook 610 and a second hook 620. The first hook 610 comprises a first pivot pin 625 and a first hook arm 630. The second hook 620 comprises a second pivot pin 635 and a second hook arm 640. The first pivot pin 625 and the second pivot pin 635 each has a cylindrical portion for the mounting plate 104 to pivot or rotate about an axis of the pins 625, 635.

Figure 8:
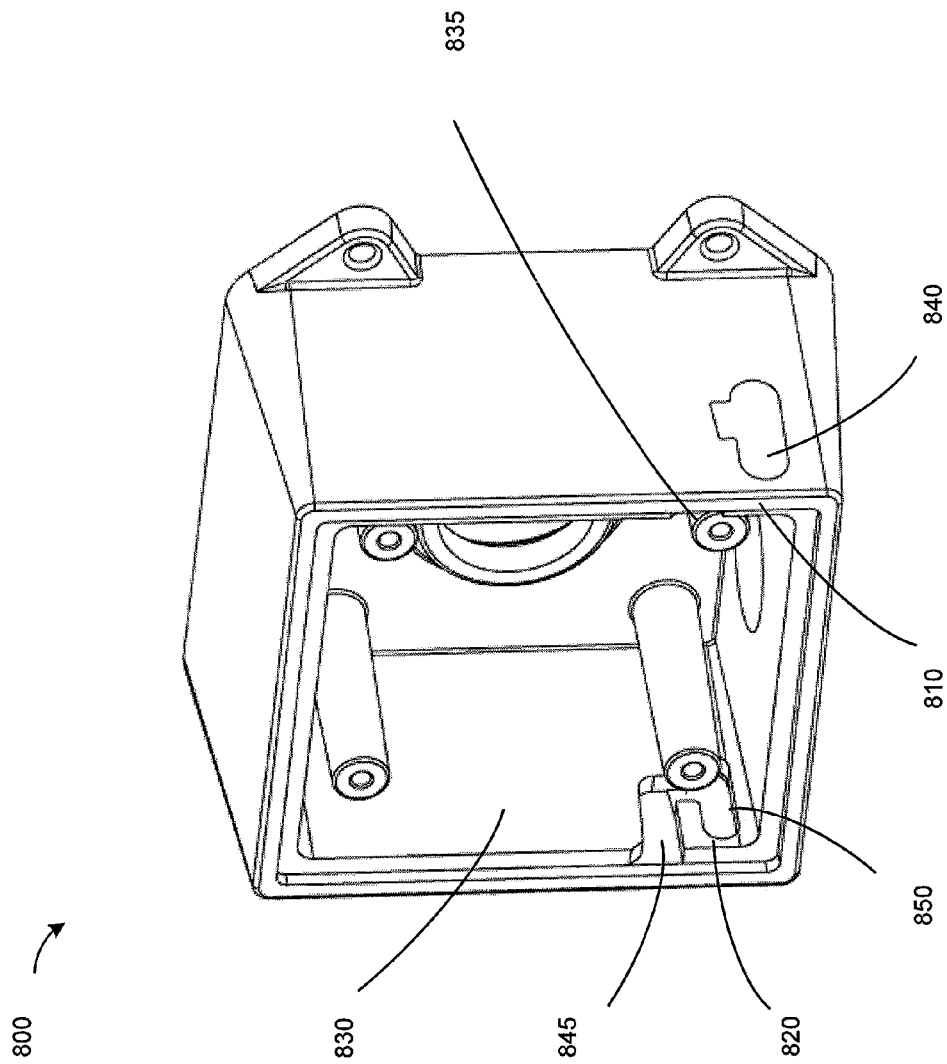
FIG. 8 A is a right perspective view of a junction box according to another embodiment.
Figure 8:
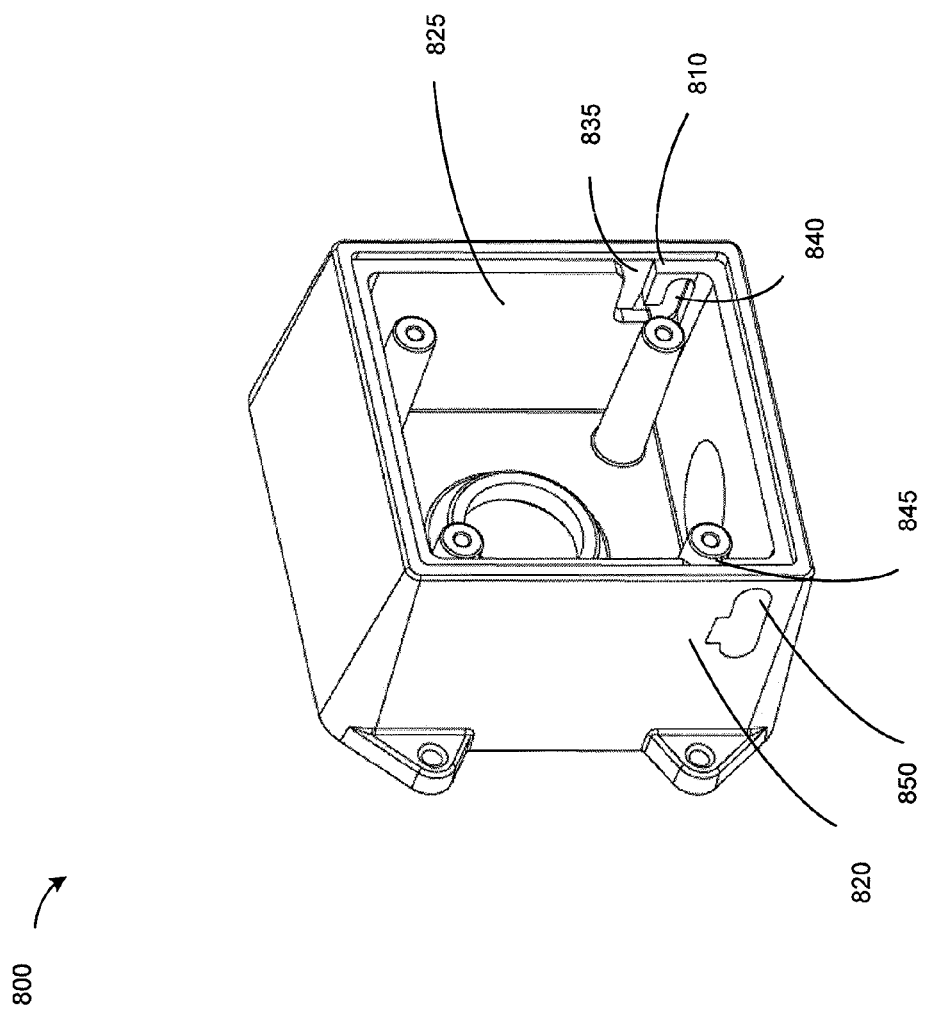

Referring now to FIGS. 8 A, 8 B, 8 C, and 8 D, there are respectively shown right and left perspective views, a top view, and a sectional view of a junction box 800. FIG. 8 C is a sectional view along line B-B of FIG. 8 B. The junction box 800 comprises a first hook slot 810 and a second hook slot 820. The first hook slot 810 is on a first inside wall 825 (at a first side) of the junction box 800 and a second hook slot 820 is on a second inside wall 830 (at a second side) of the junction box 800 where the first inside wall 825 is opposite to the second inside 830, and the first hook slot 810 and the second hook slot 820 each has an open end 835, 845 and a retaining end 840, 850.

The first hook slot 810 is a U shaped slot with the open end 835 at one end and the retaining end 840 at the other end and the second hook slot 820 is a U shaped slot with the open end 840 at one end and the retaining end 850 at the other end. The first hook slot 810 is a mirror image of the second hook slot 820. The hook slots 810, 820 are grooves in the walls of the bracket 110. Part or all of the grooves may extend through the wall of the bracket 110. As depicted in FIGS. 8 A, 8 B, 8 C and 8 D, the retained end 840, 850 extend through the wall of the bracket 110.

Figure 9:
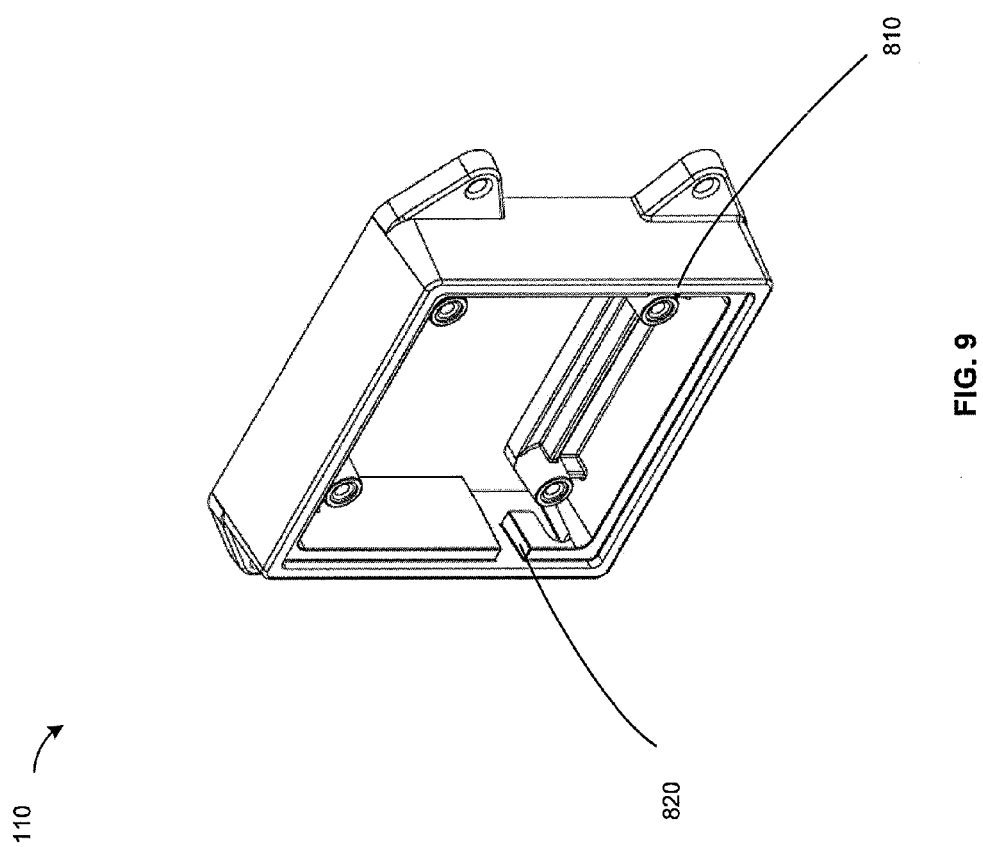
FIG. 9 is a perspective view of the mounting bracket.

Referring now to FIG. 9, there is show a perspective view of the bracket 110 with the first hook slot 810 and the second hook slot 820 built into the walls of the bracket 110. The hook slots 810, 820 are grooves in the walls of the bracket 110 with holes for the retained ends 840, 850. Alternatively, part or all of the grooves may be holes in the walls of the bracket 110. This is advantageous as the bracket 110 may be manufactured by molding for most of its features. Analogously, the junction box 800 may also be manufactured by molding.

The difference between a junction box and a bracket is that the bracket does not have a backing wall like backing wall 860 on the junction box 800. The camera assembly 100 may be mounted on either the junction box 800 or the bracket 110. A bracket is herein defined to include a junction box.

In accordance with another embodiment, the sections 122, 124 and the plates 104, 108 each have a stop block. The stop blocks 222, 224, 324, 524 limit the rotation of the swivel joints 128, 130 to approximately +/−180 degrees. The stop blocks 222, 224, 324, 524 ride in a non-continuous open groove in the sections 122, 124 and the plates 104, 108. Actual range of motion is about 350 degrees as some space is taken up by the stop blocks 222, 224, 324, 524. This feature prevents the wiring harness 120 in the device housing 102 and the bracket 110/junction box 800 by the wall from being rotated more than 360 degrees from their normal positions. This feature should prevent excessive winding of the wiring cable which could otherwise damage the connectors and or disengage the electrical connections.

Figure 10:
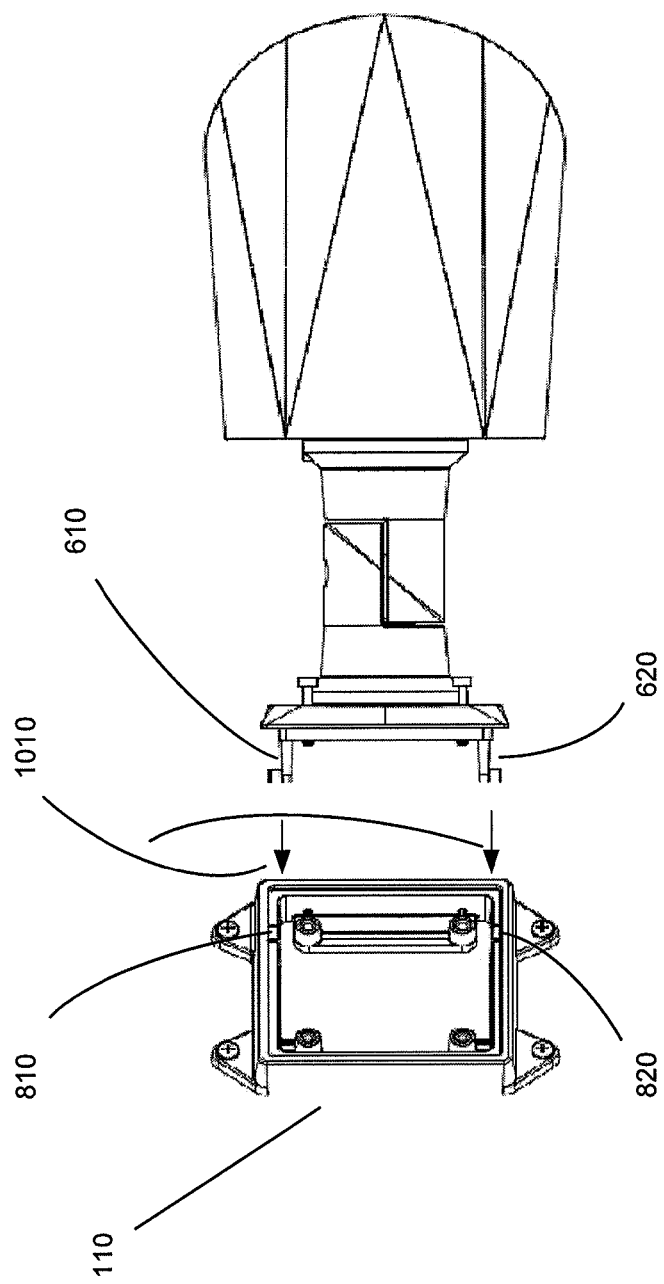
FIG. 10 is a perspective view of the camera assembly being inserted into the mounting bracket.

Referring now to FIG. 10, there is shown a perspective view of the camera assembly 100 being inserted into the bracket 110. The hooks 610, 620 and the hook slots 810, 820 together comprise a removable hinge. The insertion path indicated by arrows 1010 shows the hooks 610, 620 being inserted into the open ends 835, 845 of the hook slots 810, 820. An aligned position is when the hooks 610, 620 are at the open ends 835, 845 of the hook slots 810, 820.

The first hook 610 is on one side of the mounting plate 104 and a second hook is on an opposite side of the mounting plate 104. The first hook 610 fits into the first open end 835 of the first hook slot 810 and the second hook 620 fits into the second open end 845 of the second hook slot 820, and the first hook 610 slides along the first hook slot 810 to the first retaining end 845 and the second hook 620 slides along the second hook slot 845 to the second retaining end 850. The first hook 610 and the second hook 620 are positioned on the mounting plate 104 such that the first hook 610 and the second hook 620 are retained in the first hook slot 810 and the second hook slot 820. The mounting plate 104 is removable from the bracket 110 by sliding the first hook 610 from the first hook slot 810 out of the open end 835 and the second hook 620 from the second hook slot out 820 of the open end 845.

Figure 11:
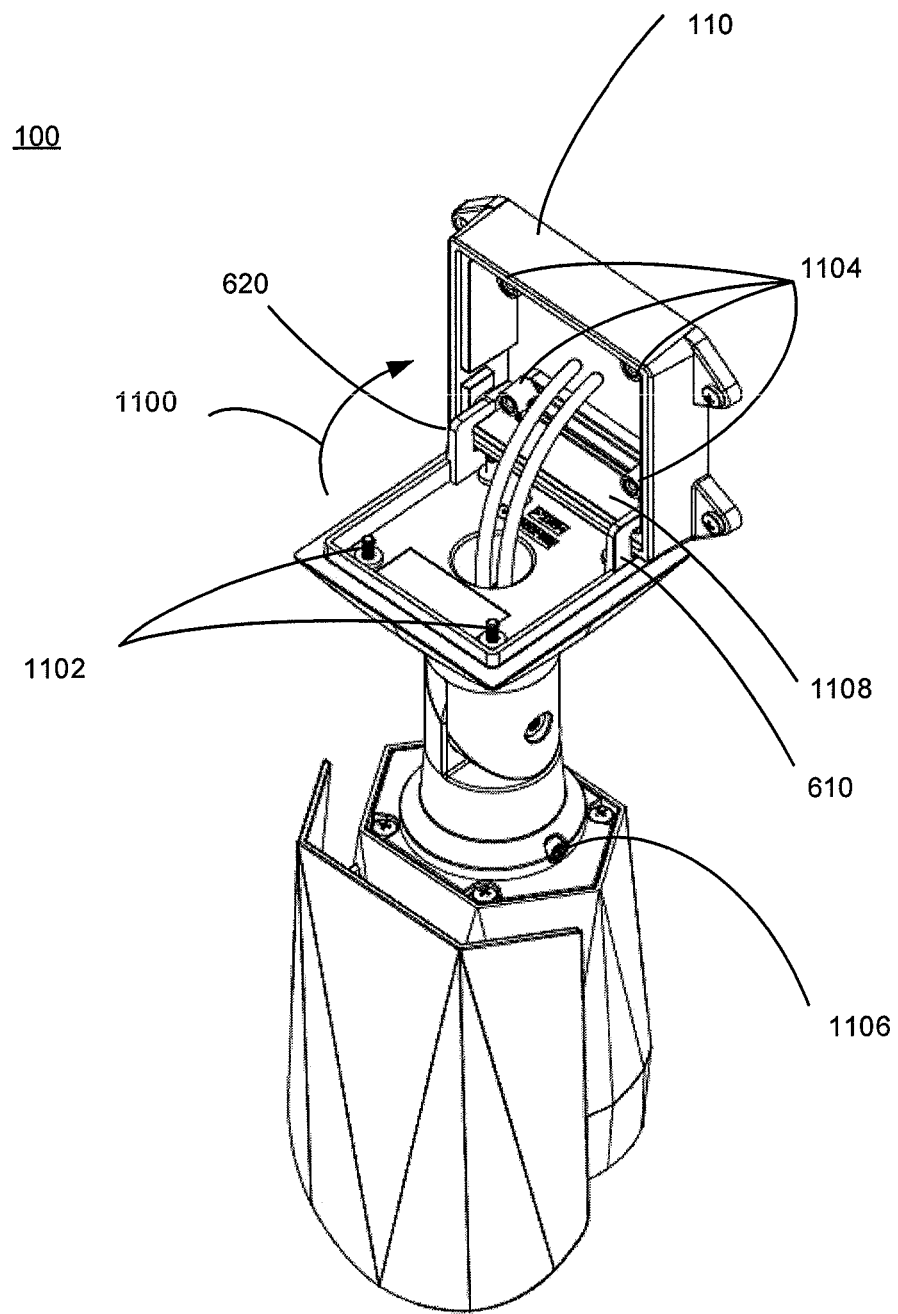
FIG. 11 is a perspective view of the camera assembly hanging on the mounting bracket.

Referring now to FIG. 11, there is show a perspective view of the camera assembly 100 hanging attached to the bracket 110. The bracket 110 is shown attached to a wall. The camera assembly 100 is rotated along path 1100 for the mounting plate 104 to close against the bracket 110 which is then locked into place by screwing screws 1102 into the screw holes 1104.

As shown, the camera assembly 100 with the mounting plate 104 is in an open position when the first hook 610 is at the retaining end 840 of the first hook slot 810 and the second hook 620 is at the retaining end 850 of the second hook slot 820.

The first hook 610 is with the first pivot pin 625 and the second hook 620 is with the second pivot pin 635, and the first pivot pin 625 and the second pivot pin 635 are respectively in the first hook slot 810 and the second hook slot 820 and are aligned along an axis such that the mounting plate 104 is hinged to the bracket 110.

As shown in FIGS. 6 and 11, the first hook arm 630 and the second hook arm 640 are configured to act as a stop to limit the mounting plate 104, hinged to the bracket 110, from opening beyond a predetermined angle. The angle is approximately 90 degrees to prevent the camera assembly 100 from rotating beyond and hitting the wall upon which the bracket 110 has been mounted. Alternatively, there are other methods of constructing a stop such as a metal tab on the bracket 110 or mounting plate 104 to prevent the camera assembly 100 from swinging beyond certain limits.

In accordance with another embodiment, the hook arms 630, 640 have pin arm portions 645, 655 and second arm portions 650, 660 joined at approximately 90 degrees, which when combined with the rest of the mounting plate 104 form a C shape for receiving a bottom wall 1108 of the bracket 110 as shown in FIG. 11. In FIG. 11, the camera assembly 100 is hanging from the bracket 110 mounted on a wall or ceiling in a wiring cable connection position or a hanging position. In this position, it is harder for the hooks 610, 620 to leave the hook slots 810, 820 of the bracket 110/junction box 800 as, firstly, the pin arm portions 645, 655 are not sized to have sufficient length to leave the retained ends 840, 850 from this position, and secondly, these parts are sized such that the parts are locked and may not be separated until the camera assembly 100 is rotated back closer to the aligned position, as shown in FIG. 10. The aligned position is for inserting (engaging) or releasing (disengaging) the hooks 610, 620 into/from the bracket 110/junction box 800.

This embodiment is particularly advantageous during installation or maintenance of the camera assembly 100 in the hanging position as it would be more difficult to accidentally knock the camera assembly 100 out of the bracket 110/junction box 800 and thereby dropping it.

Figure 12:
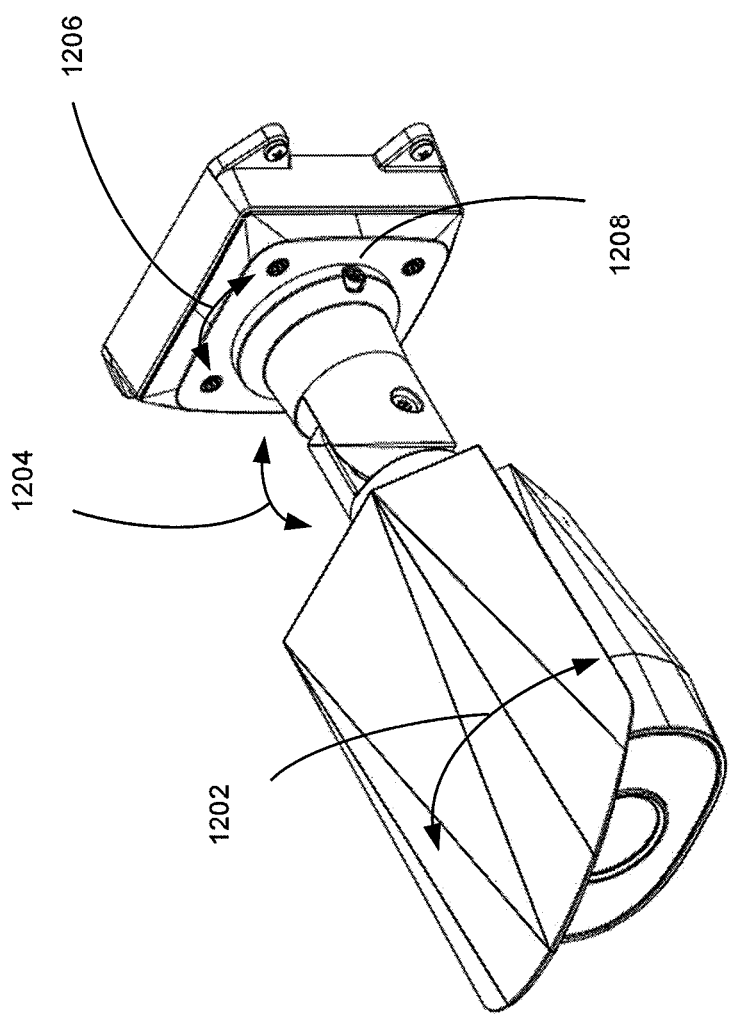
FIG. 12 is a perspective view of the camera assembly with the mounting bracket showing the rotation movements of the articulating arm.

Referring to FIG. 12, there is shown a perspective view of the camera assembly 100 installed on a wall with the bracket 110. There are shown the three possible rotations as configured. The device housing swivels or rotates 1202 relative to the device section 124. The articulating arm 106 rotates 1204 around the hinged joint 126. The mounting section 122 swivels or rotates 1206 relative to the mounting plate 104.

The shape of the mount plate 104 and the bracket 110 can be square, rectangular, hexagonal, but further may be any other shape, including irregular shapes and oval/round shapes, providing there are metal pegs or such for hook slots.

The depicted embodiments have the hooks 610, 620 attached to the mounting plate 104. Alternatively, the hooks 610, 620 may be attached to the bracket 110 and the hook slots 810, 820 being part of the mounting plate 104 instead. In addition, the mounting plate 104 may include one hook and one hook slot for mating with one hook slot and one hook on the bracket, respectively.

Figure 13:
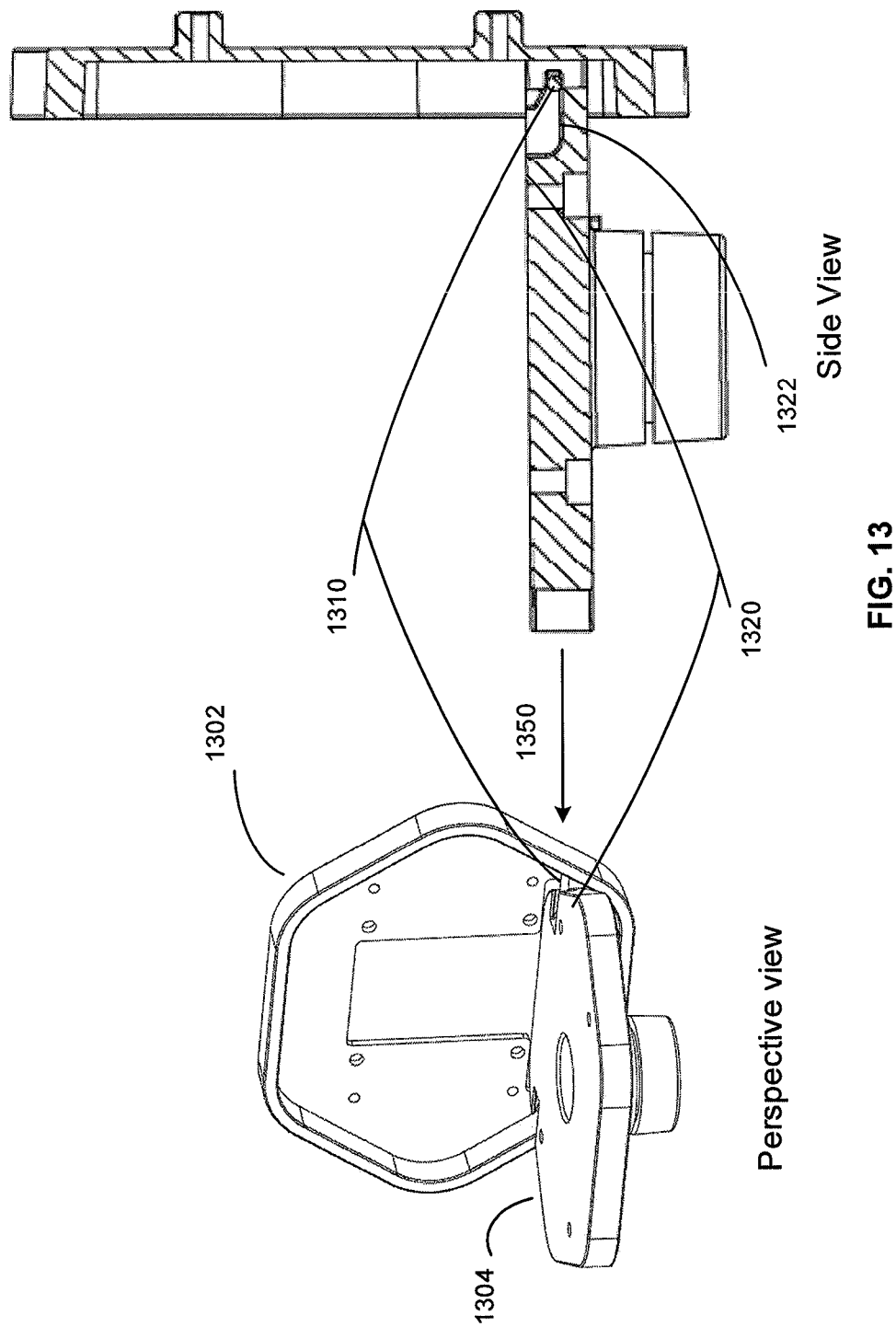
FIG. 13 is perspective view of a hex plate and a hex bracket according to another embodiment.

Referring to FIG. 13, there is shown a perspective view of a hex plate 1304 and a hex bracket 1302 with a side view of a hex hook slot 1320 in accordance with another embodiment having a hexagon shaped plate and bracket. The hex bracket 102 has a hex hook 1310 and the hex hook 1310 comprises a pivot pin with arms integrated into the walls of the hex bracket 102. The side view is viewed from angle 1350 of the hex slot 1320. FIG. 13 shows the hex plate 1304 and the hex bracket 102 in an opened position with the hex hook 1310 in a retaining end 1322 of the hex hook slot 1320.

Figure 14:
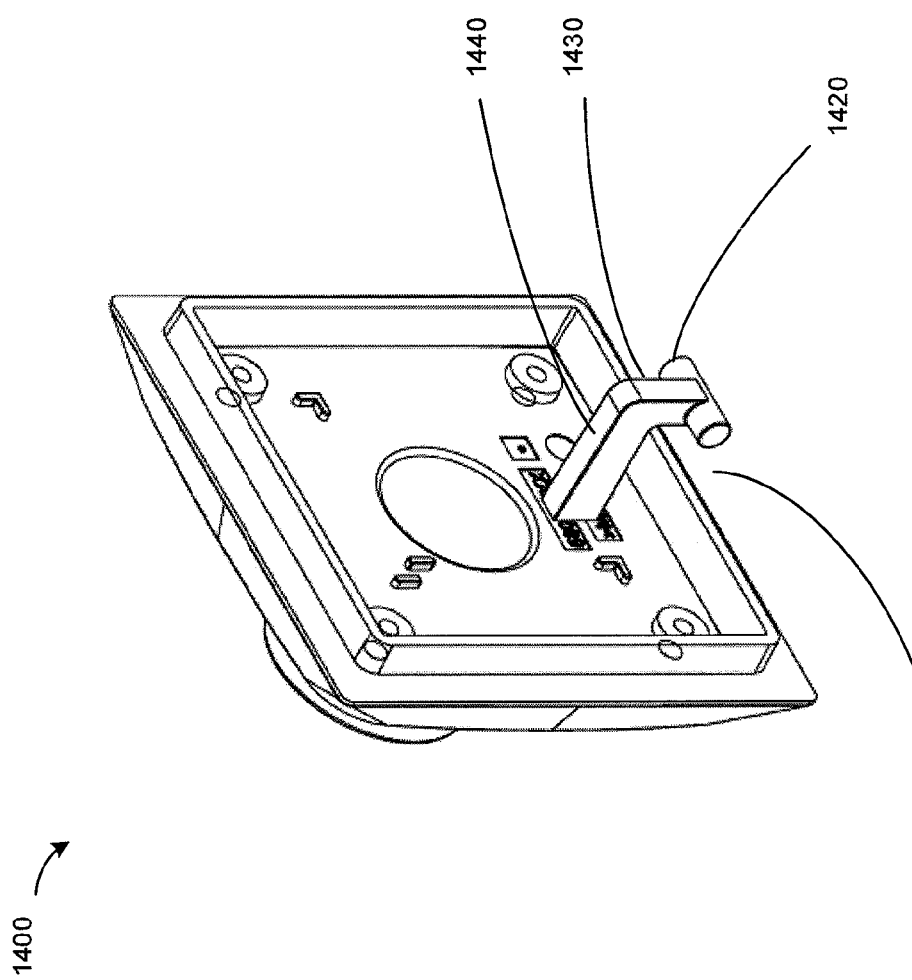
FIG. 14 is a perspective view of a plate according to another embodiment.

Referring to FIG. 14, there is shown a perspective view of a plate 1400 according to another embodiment. The plate 1400 comprises a hook 1410. The hook 1410 has a pivot pin 1420, a pin arm portion 1430, and a second arm portion 1440. The hook 1410 has a T shaped pivot pin end. Alternatively, the hook 1410 may be hooks analogous to the hooks 610, 620 place adjacent to one another to create a pivot pin end that functions the same as the T shaped pin end of the hook 1410.

Figure 15:
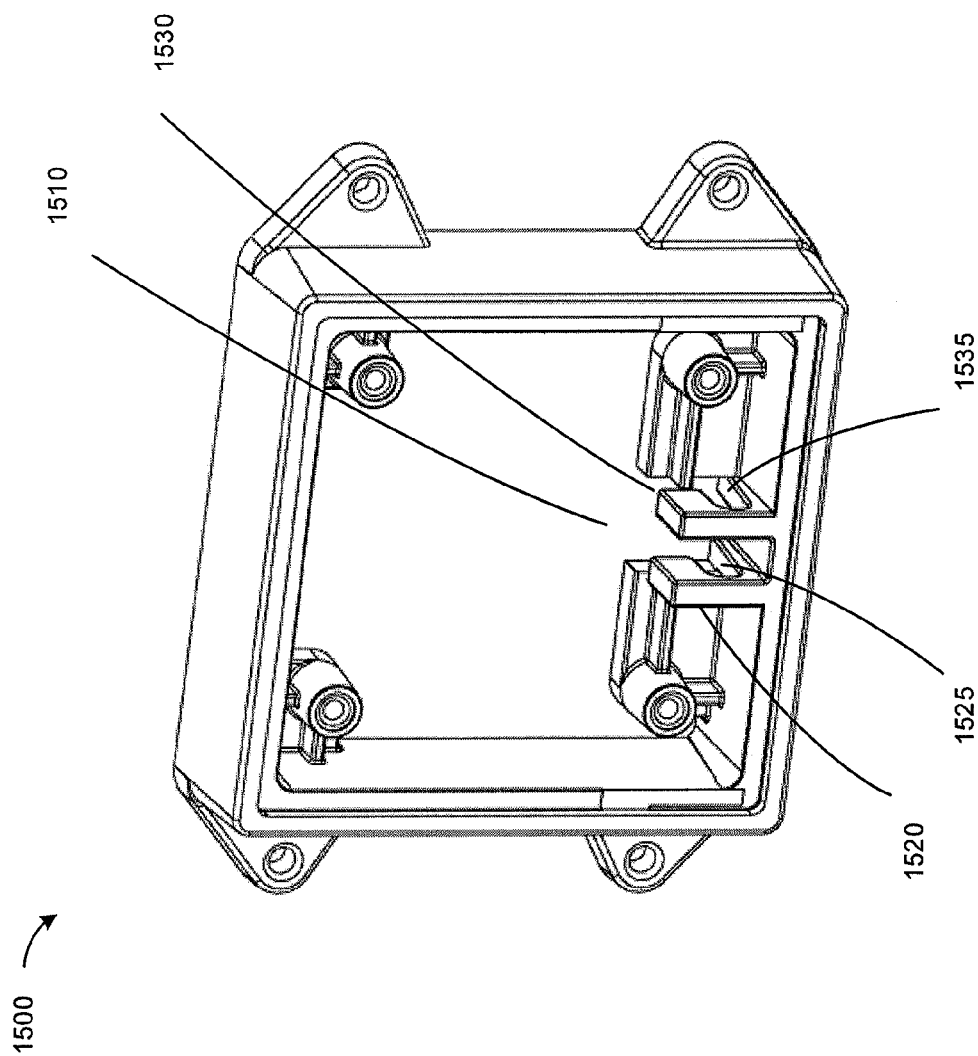
FIG. 15 is perspective view of a bracket according to another embodiment.

Referring to FIG. 15, there is shown a perspective view of a bracket 1500 according to another embodiment. The bracket 1500 comprises a first hook slot 1520 with a first retaining end 1525 on a first side and a second hook slot 1530 with a second retaining end 1535 on a second side. The hook slots 1520, 1530 analogously have open ends like the open ends 835, 845 except it would effectively be the rest of the open spaces in the bracket 1500.

Alternatively, one of the first hook slot 1520 and second hook slot 1530 may be a blank metal part (or the blank metal part is integrated into a wall of the bracket) with one of the retaining ends 1525, 1535 filled in. In this embodiment, the hook may be one of the hooks 610, 620 from the other embodiments placed accordingly.

Figure 16:
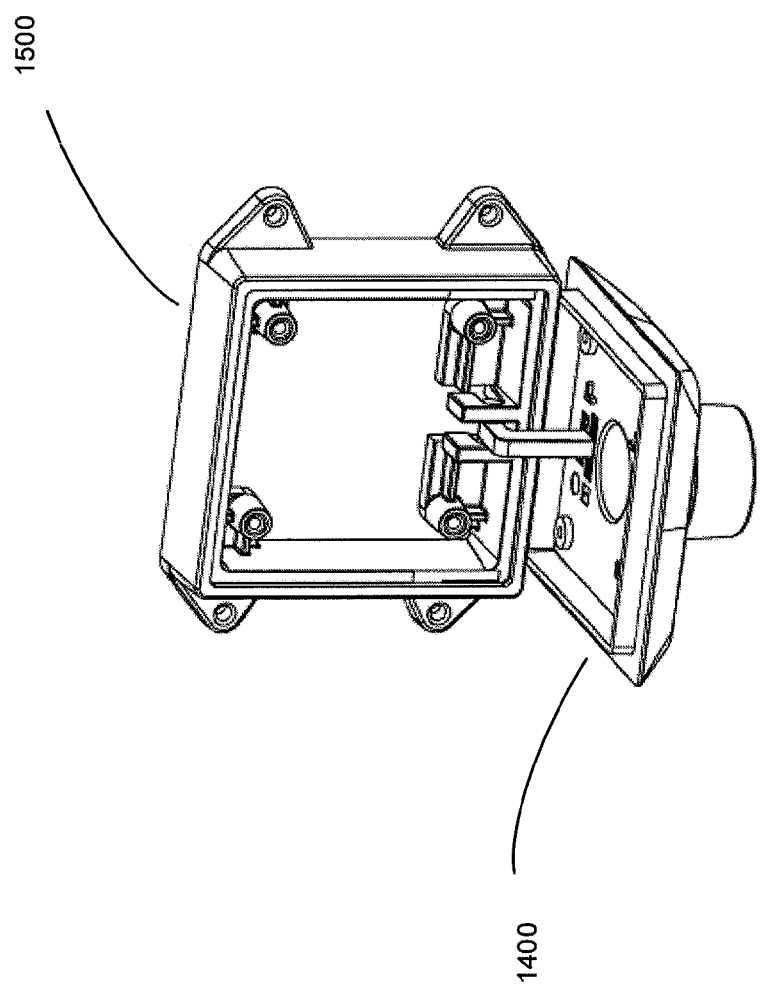
FIG. 16 is a perspective view of the plate of FIG. 14 and the bracket of FIG. 15 in a hanging position.

Referring to FIG. 16, there is shown a perspective view of the plate 1400 and the bracket 1500 in a hanging position analogous to the hanging position shown in FIG. 11 and with the same advantages thereof. The plate 1400 and the bracket 1500 analogously also have an aligned position similar to that shown in FIG. 10. While the plate 1400 and the bracket 1500 are depicted as a square or rectangle, it will be clear to any person skilled in the art that this single arm hook embodiment may be applied to any other shaped plates and brackets including hexagon, round or oval plates and brackets.

The embodiments depicted herein are particularly advantageous with the installation of a security camera. The bracket can be mounted to a wall or ceiling without the camera assembly 100 being attached. Once the bracket is mounted to wall, the camera assembly 100 with the hooks can then be inserted into the hook slots and hung in an open position for the wiring to be connected before closing the mounting plate to the bracket. The camera assembly 100 can then be rotated as shown to point the camera in the desired position before it is locked into position by, for example, three screws 132, 1106, 1208.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible. In particular, it is noted that there are many other possible, not shown, embodiments using the parts shown above such as the hooks and the hook slots.

I claim:

1. An articulating arm for mounting a device housing with a device to a mounting bracket, the arm comprising:
    a device plate connected to the device housing;
    a device section coupled to the device plate;
    a mounting section pivotably coupled to the device section at a hinged joint; and
    a mounting plate swivelly coupled to the mounting section, wherein the mounting plate comprises a stud of elongate shape having an annular groove and the mounting section comprises:
        a bore with an annular groove wherein the bore is sized for the stud to slide into the bore; and
        a first retaining ring having an inner edge and an outer edge such that the outer edge of the first retaining ring seats in the annular groove of the bore, and the inner edge of the first retaining ring seats in the annular groove of the stud.

2. The articulating arm of claim 1 wherein the device section is swivelly coupled to the device plate, the device plate comprises a stud of elongate shape having an annular groove, and the device section comprises:
    a bore with an annular groove wherein the bore of the device section is sized for the stud of the device plate to slide into the bore of the device section; and
    a second retaining ring having an inner edge and an outer edge such that the outer edge of the second retaining ring seats in the annular groove of the bore of the device section, and the inner edge of the second retaining ring seats in the annular groove of the stud of the device plate.

3. The articulating arm of claim 1 wherein the stud of the mounting plate further comprises a tapered section such that the tapered section has a smaller front end and has a larger end towards a base end, the first retaining ring seated in the annular groove of the bore is sized such that the front end of the stud is smaller than an inner edge of the first retaining ring so that the stud initially slides into the first retaining ring and the tapered section thereafter enlarges the first retaining ring as the stud slides further into the bore until the first retaining ring is seated in the annular groove of the stud to couple the mounting plate to the mounting section.

4. The articulating arm of claim 2 wherein the stud of the device plate further comprises a tapered section such that the tapered section has a smaller front end and has a larger end towards a base end, the second retaining ring seated in the annular groove of the bore of the device section is sized such that the front end of the stud of the device plate is smaller than an inner edge of the second retaining ring so that the stud of the device plate initially slides into the second retaining ring and the tapered section thereafter enlarges the second retaining ring as the stud of the device plate slides further into the bore of the device section until the second retaining ring is seated in the annular groove of the stud of the device plate to couple the device plate to the device section.

5. The articulating arm of claim 1 wherein interiors of the sections and the plates collectively comprise a wiring conduit extending through the interior of the articulating arm permitting wire to pass through the device plate and out of the mounting plate while entirely contained within the articulating arm.

6. The articulating arm of claim 1 wherein the stud and the bore of the mounting section and the mounting plate each has a cylindrical portion for the bore of the mounting section to swivel relative to the stud of the mounting plate.

7. The articulating arm of claim 2 wherein the stud and the bore of the device section and the device plate each has a cylindrical portion for the bore of the device section to swivel relative to the stud of the device plate.

8. The articulating arm of claim 5 further comprising a mounting grommet to resist the wire twisting across the hinged joint.

9. The articulating arm of claim 5 further comprising a mounting grommet and a device grommet to resist the wire twisting across the hinged joint.

10. The articulating arm of claim 1 wherein the retaining ring is one of a spiral retaining ring, split retaining ring, and circular retaining ring.

11. The articulating arm of claim 1 wherein the device plate is integrated into the device housing.

12. The articulating arm of claim 1 wherein the mounting bracket is integrated into the mounting plate.

13. The articulating arm of claim 1 further comprising a stop block on the mounting section and a stop block on the mounting plate to limit the relative rotation between the mounting section and the mounting plate.

14. The articulating arm of claim 2 further comprising a stop block on the device section and a stop block on the device plate to limit the relative rotation between the device section and the device plate.

15. A swivel joint for coupling a section and a plate of an arm, the joint comprising:
    a retaining ring;
    the plate, comprising a stud of elongate shape having an annular groove and a cylindrical portion; and
    the section, comprising:
        a bore having a cylindrical portion and an annular groove, wherein the bore is sized for the stud to slide into the bore;
        the retaining ring having an inner edge and an outer edge such that the outer edge of the retaining ring seats in the annular groove of the bore, and the inner edge of the retaining ring seats in the annular groove of the stud when the stud is slid into the bore;

wherein the stud of the plate further comprises a tapered section such that the tapered section has a smaller end integral with the front end and a larger end towards the base, the retaining ring seated in the annular groove of the bore is sized such that the front end of the stud is smaller than the inner edge of the retaining ring so that the stud initially slides into the retaining ring and the tapered section thereafter enlarges the inner edge as the stud slides further into the bore until the retaining ring is seated in the annular groove of the stud to couple the plate to the section;

wherein the cylindrical portion of the stud, the cylindrical portion of the bore, and the retaining ring are positioned to permit the section to rotate relative the plate; and wherein interiors of the section and the plate collectively comprise a wiring conduit extending through the interior of the arm permitting wire to pass through the section and out of the plate.

16. The swivel joint of claim 15 wherein the retaining ring is one of a spiral retaining ring, split retaining ring, and circular retaining ring.

17. The swivel joint of claim 15 further comprising a stop block on the section and a stop block on the plate to limit the relative rotation between the section and the plate.

18. The articulating arm of claim 1 wherein the bracket is a junction box.

\* \* \* \* \*